United States Patent [19]

Shannon

[11] 4,307,867
[45] Dec. 29, 1981

[54] MOLDS FOR SLIP-CASTING AND SIMILAR PROCESSES

[75] Inventor: Richard F. Shannon, Lancaster, Ohio

[73] Assignee: Owens-Corning Fiberglas Corporation, Toledo, Ohio

[21] Appl. No.: 176,164

[22] Filed: Aug. 7, 1980

Related U.S. Application Data

[63] Continuation of Ser. No. 100,799, Dec. 6, 1979, abandoned, which is a continuation of Ser. No. 913,419, Jun. 7, 1978, abandoned.

[51] Int. Cl.³ .................. B28B 1/26; C04B 21/00
[52] U.S. Cl. .................. 249/134; 106/383; 106/38.9; 249/141; 425/84
[58] Field of Search ............ 425/84; 249/113, 134, 249/141; 106/38.27, 38.3, 38.9, 50, 109, 110

[56] References Cited

U.S. PATENT DOCUMENTS

| | | | |
|---|---|---|---|
| 2,681,863 | 6/1954 | Croce et al. | 106/109 |
| 2,754,220 | 7/1956 | Gardner | 106/38.3 |
| 2,871,134 | 1/1959 | Loechl | 106/110 |
| 3,062,670 | 11/1962 | Marzocchi et al. | 106/109 |
| 3,147,127 | 9/1964 | Shannon | 106/99 |
| 3,289,371 | 12/1966 | Pearson et al. | 52/338 |
| 3,616,173 | 10/1971 | Green et al. | 106/110 |
| 3,885,980 | 5/1975 | Noone | 106/109 |
| 3,887,386 | 6/1975 | Majumdar | 106/50 |
| 3,948,673 | 4/1976 | Chase et al. | 106/99 |
| 4,072,534 | 2/1978 | Ryder | 106/109 |
| 4,185,138 | 1/1980 | Graham | 428/391 |
| 4,187,275 | 2/1980 | Bracalielly et al. | 264/76 |
| 4,200,487 | 4/1980 | Bondoc | 162/135 |

*Primary Examiner*—James B. Lowe
*Attorney, Agent, or Firm*—Ronald C. Hudgens; Robert F. Rywalski; William P. Hickey

[57] ABSTRACT

A mold for slip-casting and the like comprising: a gypsum or other water pervious body having a three-dimensional network of chopped glass fiber filaments having a water wettable surface thereon and in an amount of more than 924 lineal inches of filament per cubic inch of the water pervious body. The preferred mold is a gypsum mold having from 4,621 lineal inches of filament to 46,210 lineal inches of filament per cubic inch of gypsum.

10 Claims, 3 Drawing Figures

MOLDS FOR SLIP-CASTING AND SIMILAR PROCESSES

This is a continuation, of application Ser. No. 100,799, filed Dec. 6, 1979 now abandoned, which in turn is a continuation of application Ser. No. 913,419 filed June 7, 1978 now abandoned.

The present invention relates to new and improved molds for producing ceramic slip-cast ware, as for example, ceramic sanitary ware.

The slip-cast process for producing ceramic ware is a very old process and has been used to produce substantially all of the ceramic sanitary ware since the start of this industry. Sanitary ware are of complicated shapes and have hidden passageways, so that the slip-casting process is ideally suited for producing these complicated structures.

In the slip-casting process, an aqueous suspension of clay materials is let stand against a surface of desired contour which is water pervious. As the water of the slurry passes through the pervious surface, a build-up of the suspended clay materials is deposited on the surface; and when this build-up reaches a desired thickness, any excess slurry is poured off, and the deposited clay is removed from the surface for drying and firing. Where hidden passageways are to be produced, the clay slip is poured between opposing water pervious surfaces that are spaced apart by a distance equal to the thickness of the desired passageway plus the thickness of the ceramic that is desired on both sides of this passageway. A supply of slip is communicated to between the surfaces in a manner which assures a supply to both surfaces as the water proceeds out of both surfaces. By keeping the slurry supplied to both surfaces, a substantially equal build-up of clay occurs on both surfaces; and when this build-up equals the desired ceramic thickness, any remaining slurry is poured out from between the surfaces of the mold to leave the desired passageway. It will, therefore, be seen that slip-casting has the very great advantage of being able to provide internal passageways without the use of cores, etc. Plaster of Paris, or gypsum hemi-hydrate, is an ideal material for producing the surfaces of slip-cast molds; since gypsum cements can be cast into complicated shapes, it hardens into a generally water insoluble surface, and the surface is pervious to water. What is more, the clay bodies which build up upon gypsum surfaces do not adhere thereto, and can be stripped therefrom without breaking.

For the above reasons, slip-casting molds have been substantially universally made from cast gypsum. One of the principle problems with gypsum molds is that it may take 8 hours or more from the time that the clay slurry is poured into the mold, before the part that is produced has then been dewatered to the point where the slip-cast material is handleable. Gypsum slip-cast molds are heavy, delicate, and fragile; and constitute one of the major processing expenses of the slip-casting industry. Gypsum slip-cast molds may produce hundreds of parts before chipping and cracking of the gypsum proceeds to the point where the molds are no longer economically reparable. This short life occurs even when the gypsum is reinforced by fibrous materials including glass fiber strand. Prior to the present invention, the benefits which were derived by using glass fiber strand has not proven economical to the degree necessary for general acceptance by the industry.

According to principles of the present invention, it has been discovered that chopped glass fiber strand having a size thereon which solubilized when mixed into the gypsum cement slurry will produce a mold which may have production rate approximately 20% greater than does either a nonreinforced gypsum mold, or a gypsum mold that is reinforced by nonfilamentized glass strand. This has been a completely unobvious and unexpected result, and is perhaps the first development since the start of the industry to significantly increase the rate of production that is possible from slip-casting molds.

A principle object of the present invention, therefore, is the provision of a new and improved mold for producing slip-cast ware which will increase the rate at which water passes through the mold.

A further object of the present invention is the provision of a new and improved material for producing molds of the above described type, which have a greater mold life.

Further objects and advantages of the invention will become apparent to those skilled in the art to which the invention relates from the following description of the preferred embodiments hereinafter described.

DESCRIPTION OF THE PREFERRED EMBODIMENTS

Figure 1:
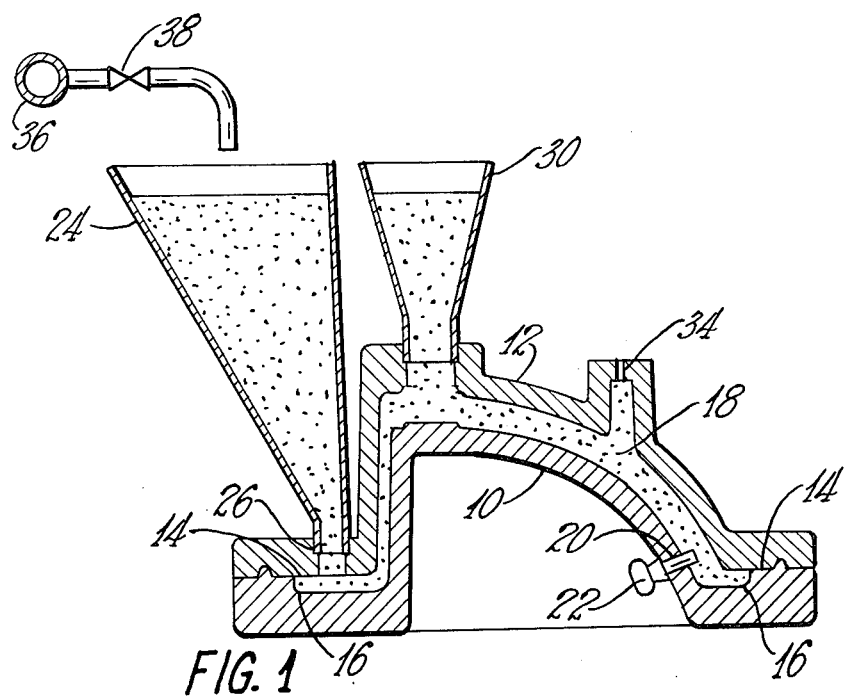
FIG. 1 is a vertical section through the center line of a two-piece mold for producing the ceramic lavatory shown in FIG. 3.

As previously mentioned, the new and improved molds of the present invention will have advantages in any slip-casting operation. As exemplary of the type of molds with which the invention is concerned, there is shown in the drawings a two-piece mold for producing a clay wash basin having a totally enclosed internal overflow passage. It will be understood, however, that the molds of the present invention will have equal advantages in all sanitary ware such as toilets, bidets, tanks, urinals, etc.; as well as other items of ceramic ware, as for example, plates, slip-cast tile, etc.

Figure 2:
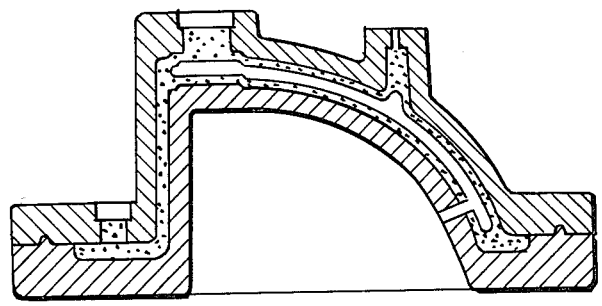
FIG. 2 is a vertical sectional view substantially identical with that of FIG. 1 but showing a slip-cast part produced therein prior to separation of the parts of the mold.
Figure 3:
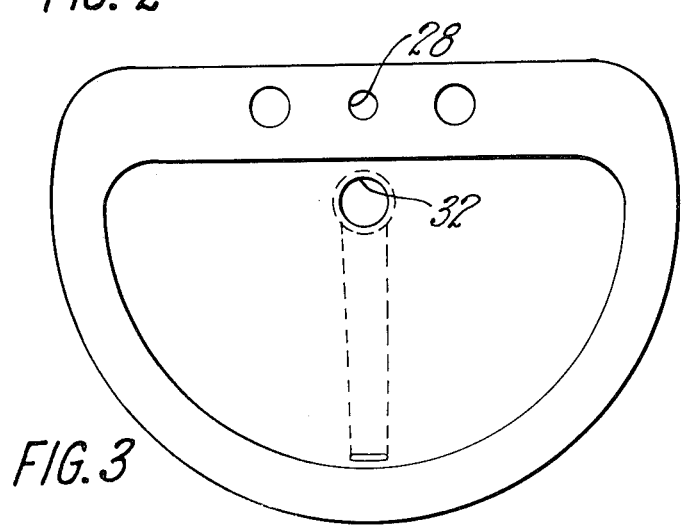
FIG. 3 is a plan view of the lavatory that is produced in the mold shown in FIGS. 1 and 2.

The lavatory mold shown in the drawing comprises: a male mold portion 10 and a female mold portion 12 which abut each other on a plane that is generally coextensive with the bottom edge of the lip 16 which extends around the lavatory and which sits on top of the supporting cabinetry. The mold portions 10 and 12 are designed to produce a lavatory having a blind overflow passage leading from the front of the basin to the drain; and accordingly the space or cavity 18 between the mold portions 10 and 12 on the centerline where the drain is to be produced, equals the desired width of the internal passageway plus the desired thickness of ceramic material on opposite sides thereof. The space between those portions of the mold which are intended to produce a single thickness of material is equal to the desired thickness of material. An opening 20 is provided in the male mold 10 at the location where the drain hole is desired, and a plastic plug 22 is inserted therein. One of the concerns in the design of the mold is that all air is swept free of long thin passageways when the mold is filled. This is accomplished in the mold shown in the drawing by providing a filling funnel 24 with its bottom end wedged into an opening 26 which communicates with the area of the lip 16 which will later be cut out to form the opening 28 in the lavatory for receiving a stopper control rod, not shown. A riser funnel 30 is positioned in the area of the female mold portion 12 where the drain 32 is located; and one or more vent openings 34 is provided in the area of the female mold portion 12 where experience indicates air bubbles may collect when the mold is filled. The two mold portions 10 and 12 may be clamped together at their edges by any suitable means, as for example, by commercial toggle clamps; and the slip may be added to the funnel 24 by any suitable means, preferably by a slurry recirculation system from which slurry is obtained through a side outlet tee 36 and shut-off valve 38. The filling funnel 24 is filled with slurry to a level well above the top surface of the mold cavity 18; so that it rises up in the riser funnel 30 by an amount which will assure sufficient solids to provide the desired thickness of deposit on each mold portion. The mold portions 10 and 12 are, of course, pervious to water, so that the water of the slurry slowly exudes out of both mold portions 10 and 12 to, in effect, strain out the slurry solids on all surfaces of the cavity 18. A generally predetermined amount of slurry is added to the funnel 24 initially. When the slurry level has drained down to a predetermined level adjacent to top of the mold 12, the plastic plug 22 is pulled, to allow the excess of liquid in the cavity 12 to drain out, as shown in FIG. 2. The funnels 24 and 30 are removed at this time, and the mold is let stand for a sufficent period of time for the desposited clay body, to dry to a condition wherein the clay will retain its shape when the mold portions 10 and 12 are separated. The time required for clay separation and build-up on the mold surfaces, plus the time required for drying of the clay build-up to a handeable state, may take as much as 8 hours and, of course, will depend upon the particular molds and configuration being cast.

According to principles of the present invention, a new and improved water pervious mold material is provided which will increase the rate at which water passes therethrough by more than approximately 20%. According to the present invention, it has been discovered that if water wettable fibers are present in an individually spaced apart condition, rather than in the form of bundles as occurs in strand, an increase in drying rate is had. The same effect is not had, however, if the filaments are held together in the form of bundles. The reasons why this is so have not been completely established. It is believed that for monofilaments on which the angle of wetting approaches zero, water applied to one end of the fiber spreads over the surface of the fiber to its opposite end. If the opposite end is adjacent another fiber, the water transfers to the other fiber and the process is repeated. On the other hand, if the fibers are present in the form of a bundle, the water is held within the bundle by capillary attraction. Strands have a very small exposed surface so that evaporation from the end of a strand occurs at a much slower rate than it does from the exterior surface of a similar number of filaments.

Conventionally, the molds for slip-casting have been made of gypsum. In my efforts to reinforce a gypsum mold material with chopped strand, no observable increase in drying rate occurred. I discovered, however, that if the chopped strand had a size thereon which was water dispersible, and if I used a mixing procedure of the chopped strand with the gypsum slurry which broke the chopped strand completely apart into its filaments, the filaments were dispersed throughout the slurry and an unexpected increase in drying rate was had. It has been found that the dispersed monofilaments arrange themselves in a three-dimensional network which passes through or adjacent all of the interstitial spaces between crystals of the gypsum mold material. Monofilaments may be thought of as sticks having a diameter less than approximately 0.0010 inches, which, of course, are sufficiently tiny that the zeta potential of the water wetted filaments is capable of repelling each other and dispersing the monofilaments generally uniformly throughout a gypsum slurry. On the other hand, chopped strands comprise more than 200 filaments, and the zeta potential around the outside of such a bundle of filaments is not sufficiently strong to uniformly disperse the bundles.

By way of example, a gypsum mold similar to those shown in the drawings is produced form a creamy mix of gypsum hemihydrate and water, and to which 0.2% by weight of solids of a filamentizable strand that is chopped into ½ inch lengths is added. This mix is agitated for a sufficient period of time to completely break the bundles apart and to distribute the filaments generally uniformly throughout the slurry. A suitable strand will comprise 440 E-glass filaments, each having a diameter of 0.00036 inch, and which strand is held together by 0.6% by weight of the following size:

| | |
|---|---|
| Polyvinyl acetate copolymer containing sufficient polyvinyl alcohol groups to make the copolymer water dispersible | 92% |
| Cationic lubricant (Fatty acid tetraethylene pentamine condensate) | 2.2% |
| Glacial acetic acid | 1.75% |
| Ammonium chloride | 1.5% |
| Nonionic wetting agent (Octyl phenoxy polyethoxy ethanol) | 1.6% |

The slurry is then cast into the desired shape of the mold. The resulting mold will have a rate of drying that is more than approximately 20% greater than a mold that is made from gypsum which is devoid of the glass filaments. This is also true if the mold is made from gypsum containing 0.2% of a nonfilamentizable chopped strand. It is also true that this improvement in drying is not had if the filaments of the water dispersible strand have a water repellent thereon, such as a nonionic lubricant, or a silicone solution.

In general, it has been found that a detectable increase in drying rate will occur when the mold contains as little as 0.01% by weight of solids of water wettable dispersed glass filaments, and that the rate of drying will increase as the amount of dispersible filaments added increases. As a practical matter, no more than approximately 1% of chopped glass fiber filaments can be added to gypsum slurry without creating mixing problems, and the preferred range of water wettable dispersed filaments will be between approximately 0.05% and 0.5%. The following is a table which gives the number of lineal inches of filament per cubic inch of nonfoamed product having a density of 0.0838 lb./cubic inch for different weight percentages of glass filaments having a diameter of 0.00036 inch.

| Percent By Weight | Inches of filament per .0838 lb. per cubic inch of product |
| --- | --- |
| 0.01 | 924 |
| 0.05 | 4,621 |
| 0.2 | 18,480 |
| 0.5 | 46,210 |

The network of filaments that is utilized in the method and materials of the present invention must be formed by substantially completely filamentized strand. Strand that is not filamentized has voids between the filaments which attract and hold water. On the other hand, individual filaments retain only a very thin layer of water, perhaps several molecules thick, and this water spreads almost indefinitely along the surface since the angle of wetting on nascent glass approaches zero. Since this is necessary, the surface of the individual filaments must not be poisoned by silicones, organic polymers, or other nonwetting materials. It is known that nascent glass fibers in water have identical negative charges which repell each other; and this phenomenon is believed necessary to disperse the individual filaments and form the three dimensional criss-crossing fiber network that is necessary to pass through or adjacent all interstitial spaces of the gypsum molds. The filaments used in the present invention develop a zeta potential of mutually repelling negative charges which causes them to repell each other and spread throughout the gypsum material. The same will be true, however, if the mold is made from some other water pervious material, other than gypsum, such as a Portland cement mortar, or an aluminum silicate cement. The filaments should preferably have a length of more than one eighth inch.

While the invention has been described as embodied in gypsum molds, wherein the glass filaments network extends from the molding surface to the outside surface of the mold, it is not so limited. In some instances, it may be desirable to provide a water pervious coating over the portion of the mold which contains the monofilament network. In such instances, it will be seen that the monofilament network will still remove water from the water pervious coating of the mold. It will further be seen that the manner in which the water spreads along the surface of the filament network is not dependent upon the pervious material on which the mold itself is made, and that the monofilament network of the present invention will increase the drying rate of any water pervious mold. Gypsum, however, is a low cost and inexpensive mold material that is easily cast into complicated shapes. Therefore, it is desired to specifically cover gypsum molds that contain the monofilament network of the present invention.

While the invention has been described in considerable detail, I do not wish to be limited to the particular embodiments shown and described; and it is my intention to cover hereby all novel adaptations, modifications, and arrangements thereof which come within the practice of those skilled in the art to which the invention relates, and which come within the purview of the following claims.

I claim:

1. A new and improved mold for producing ceramic slip cast ware and the like, comprising: a body having a forming surface of desired shape to which a ceramic slip is communicated, said body having pores which strain out ceramic particles of the slip without having the ceramic particles becoming locked therein and while allowing water from the slip to pass therethrough, said body having chopped water wettable spaced apart monofilaments embedded therein for conducting water away from said forming surface, said monofilaments being at a loading of at least approximately 675 inches per cubic inch of solid body.

2. The new and improved mold of claim 1 wherein the water wettable monofilaments are glass monofilaments.

3. The new and improved mold of claim 1 wherein said monofilaments are in the form of a three dimensional network.

4. The new and improved mold of claim 1 wherein said water transfer portion containing the monofilaments consists essentially of gypsum.

5. A new and improved mold for producing ceramic slip-cast ware and the like comprising: a porous body having a forming surface of desired shape to which a ceramic slip is communicated, said body having pores which strain out particles of the slip without having the ceramic particles becoming locked therein and while allowing water from the slip to pass therethrough, said porous body having a three dimensional network of chopped glass monifilaments spaced apart and embedded therein, said monofilaments being at a loading of at least 3,376 inches per cubic inch of the solids of the porous body.

6. The mold of claim 5 wherein the filaments have a negative zeta potential in water.

7. The mold of claim 5 wherein the monofilaments have a diameter less than 0.0010 inch.

8. The mold of claim 7 wherein the monofilaments have a length of more than approximately one eighth inch.

9. The mold of claim 5 wherein said water transfer portion consists essentially of gypsum.

10. The mold of claim 9 wherein said network of monofilaments extends between opposite surfaces of the mold.

* * * * *